United States Patent [19]

Hane et al.

[11] Patent Number: 5,748,373
[45] Date of Patent: May 5, 1998

[54] SCALE AND ENCODER INCLUDING DIFFERENTLY SPACED PATTERN LINES

[75] Inventors: Kazuhiro Hane, Miyagi; Atsushi Ieki, Gifu, both of Japan

[73] Assignee: Okuma Corporation, Aichi, Japan

[21] Appl. No.: 633,500

[22] Filed: Apr. 17, 1996

[30] Foreign Application Priority Data

Apr. 17, 1995 [JP] Japan .................. 7-114034

[51] Int. Cl.$^6$ .................. G02B 5/18; G01B 9/02
[52] U.S. Cl. .................. 359/575; 250/237 G; 356/356
[58] Field of Search .................. 359/569, 575, 359/566; 250/237 G; 356/356

[56] References Cited

U.S. PATENT DOCUMENTS

| | | | |
|---|---|---|---|
| 4,667,099 | 5/1987 | Arai et al. | 250/237 G |
| 5,068,530 | 11/1991 | Ieki et al. | 250/237 G |
| 5,182,613 | 1/1993 | Ieki et al. | 250/237 G |
| 5,422,723 | 6/1995 | Paranjpe et al. | 356/355 |
| 5,428,445 | 6/1995 | Holzapfel | 350/237 G |
| 5,528,364 | 6/1996 | Koike | 359/575 |

FOREIGN PATENT DOCUMENTS

| | | | |
|---|---|---|---|
| 46-19819 | 6/1971 | Japan | 359/569 |
| 3-48122 | 3/1991 | Japan . | |
| 909648 | 2/1982 | U.S.S.R. | 359/569 |

*Primary Examiner*—Jon W. Henry
*Attorney, Agent, or Firm*—Wenderoth, Lind & Ponack

[57] ABSTRACT

A scale and encoder are capable of stably outputting a displacement signal with less distortion. The scale has grating pattern lines arranged successively, and the widths of the pattern lines of a second scale are not P/2 but are determined to remove high-order distortion components on the grating pattern. For example, for removing the third and fifth order distortion components, the scale is made to include two slits in which pattern line widths are 17P/30 and 23P/30.

5 Claims, 13 Drawing Sheets

| 2L | 2L' |
|---|---|
| P/30 | 19P/30 |
| 3P/30 | 57P/30 |
| 5P/30 | 35P/30 |
| 7P/30 | 13P/30 |
| 9P/30 | 51P/30 |
| 11P/30 | 29P/30 |
| 13P/30 | 67P/30 |
| 15P/30 | 45P/30 |
| 17P/30 | 23P/30 |
| 21P/30 | 39P/30 |
| 25P/30 | 55P/30 |
| 27P/30 | 33P/30 |
| 31P/30 | 49P/30 |
| 37P/30 | 43P/30 |
| 41P/30 | 59P/30 |
| 47P/30 | 53P/30 |

FIG.6

SCALE AND ENCODER INCLUDING DIFFERENTLY SPACED PATTERN LINES

BACKGROUND OF THE INVENTION

1. Field of the Invention

The present invention relates to a scale for use in encoders and spectroscopes, and to an encoder available for position instrumentations for machine tools, semiconductor manufacturing equipment and other apparatus.

2. Description of the Prior Art

In a prior optical encoder, for example, first and second diffraction gratings or lattices (which will hereinafter be referred to as "first grating" and "second grating", respectively) are used such that the second grating is disposed in the rear of the first grating and relatively moves in its longitudinal directions with respect to the first grating. A photoelectric conversion element is situated in the rear of the second grating. As shown in FIG. 1 each of the first and second gratings 2 has a grating section where light-transmittable portions (which will be referred hereinafter to as "transparent portions") and light-nontransmittable portions (which will be referred hereinafter to as "nontransparent portions") are repeatedly arranged in succession at a given interval (which will be referred hereinafter to as a "grating pitch").

With such a structure, when a parallel light beam or luminous flux L falls on the first grating, light passing through the first and second gratings 2 reaches the photoelectric conversion element which, in turn, converts the received light into an electric signal corresponding to the received light intensity and outputs the electric signal. The variation of the generated electric signal is caused by the variation of quantity of light penetrating the first and second gratings 2 resulting from the relative displacement of the first and second gratings 2. Further, although this varying signal should originally assume a triangular wave configuration equivalent to the apparent variation of the transparent portions viewed from the light emitting side due to the overlapping conditions of the first and second gratings 2, in fact the signal contains various distortions attributed to light diffractions or the like. Thus, for the position detection this varying signal is regarded to be a pseudo sine wave.

In the prior optical encoder using the grating section as shown in FIG. 1 the position detection value based on the varying signal involves great division errors because of its included distortion components. In addition, the distortion factor of the varying signal obtainable by the aforesaid prior optical encoder greatly changes in response to variation of the separation between the first and second gratings 2. For the above reason, in order to suppress the error to below a given value, the separation between the first and second gratings 2 is required to be maintained to an appropriate constant value, and hence there has been a need for extremely high fitting accuracy.

Therefore, the applicants have proposed an optical encoder in which, for removal of the distortion components, the intervals between the adjacent lines of the grating pattern are made so as not to be equal to each other and formed to have a given phase difference to thereby remove the n-th order distortion components (for example, disclosed in the Japanese Patent Application Laid-open No. 3-48122). FIG. 2 shows patterns which are capable of removing third and fifth order higher harmonic components primarily causing the detection errors. Further, forming the pattern of the second grating 2 with photoelectric conversion elements is also possible for size reduction of the system.

There is a problem which arises when removing the third and fifth order higher harmonic distortion components with such an arrangement, however, in that at least four slits are necessary. That is, sufficient number of the slits can exhibit a sufficient averaging effect regardless of nonuniformity of the irradiating beams, while a lesser number of slits, for example 4 to several slits, impairs the averaging effect, reducing the abiliting to remove the third and fifth order higher harmonic distortion components. In addition, for an optical grating, there has been known a way of manufacturing a sine wave grating by means of continuously varying the distribution of the transmittance. In this instance, no grating contains distortion components, with the result that the varying signal does not include distortion components. However, difficulty is experienced in fabricating the sine wave grating according to the above method, and hence such a manufacturing method has hardly been put into practical use. This is because it is very difficult to continuously change the distribution of the transmittance on the grating.

SUMMARY OF THE INVENTION

The present invention has been developed with the view of eliminating the problems described above, and it is therefore an object of the present invention to easily provide a scale with less distortion, as well as to provide an encoder which is capable of stably outputting a varying signal with less distortion.

The present invention relates to a scale represented by an optical grating applicable to encoders or spectroscopes, and the aforesaid object of the present invention is accomplished by determining the widths of the lines of a grating pattern of the scale so that the distortion components are removable.

Furthermore, an encoder according to the present invention has a first scale and a second scale relatively displaced with respect to the first scale to detect the relative position. The aforesaid object of the present invention is accomplished in such a manner that at least one of the first and second scales is made so that the widths of the lines of the grating pattern are determined to remove the high order distortion components of the grating pattern.

According to the present invention, a scale having a grating pattern comprises a plurality of pattern lines having widths determined so as to remove a high-order distortion component with the distribution of the pattern lines. The pattern lines have, for removing given a-order and b-distortion components, widths that are not equal to each other. The pattern lines of the grating pattern include pattern lines with widths W and W' that are given by pattern line width $W = P \times \Sigma\Sigma(n/a + (1+2m)/2b)$ pattern line width $W' = P \times \Sigma\Sigma(n/a - (1+2m)/2b)$ where n can range from $-\infty$ to $\infty$ and m can range from $-\infty$ to $\infty$, wherein a and b are integers equal to 2 or greater, and wherein P is the pattern line period.

The above scale, for removing given third order and fifth order distortion components, has the pattern line width W not constant, and the grating pattern includes at least one of the pattern lines having a width W that is 17P/30 and 23P/30, at least one of the pattern lines having a width W that is 11P/30 and 29P/30, at least one of the pattern lines having a width W that is 7P/30 and 13P/30, at least one of the pattern lines having a width W that is P/30 and 19P/30, and at least one of the pattern lines having a width W that is 5P/30 and 35P/30.

The present invention further contemplates an encoder that comprises a first scale and a second scale movable relative to the first scale for detecting a displacement. At least one of the first and second scales has a grating pattern as described two paragraphs above.

The present invention further contemplates a scale having a grating pattern comprising a plurality of pattern lines therein. The pattern lines have widths and intervals that are not equal to each other and that are determined so as to remove a high-order distortion component. The pattern lines have, for removing given a-order and b-order distortion components, widths that are not constant, wherein the pattern lines of the grating pattern comprise pattern lines with widths W and W' that are determined by the equations below. The pattern lines have spaces therebetween that are not equal to each other. For removing given c-order and d-order distortion components, the grating pattern includes the pattern lines having phase differences of $P/(2 \cdot c)$, $P/(2 \cdot d)$, $P/(2 \cdot e)$, $P/(2 \cdot f)$ . . . with respect to a reference phase and having phase differences corresponding to combinations of the respective phase differences, where c, d, e, f . . . denote a positive integer and P designates an average period of the pattern lines.

pattern line width $W = P \times \Sigma\Sigma(n/a + (1+2m)/2b)$ pattern line width $W' = P \times \Sigma\Sigma(n/a - (1+2m)/2b)$ where n can range from $-\infty$ to $\infty$ and m can range from $-\infty$ to $\infty$, wherein a and b are integers equal to 2 or greater, and wherein P is the pattern line period.

The invention further contemplates an encoder having a first scale and a second scale movable relative to the first scale for detecting a displacement. At least one of the first and second scales comprises a grating pattern as described in the preceding paragraph.

BRIEF DESCRIPTION OF THE DRAWINGS

The objects and features of the present invention will become more readily apparent from the following detailed description of the preferred embodiments taken in conjunction with the accompanying drawings in which:

FIG. 6 is an illustration of an example of data on the widths of the lines of a further example of a grating section in the FIG. 3 embodiment;

DESCRIPTION OF THE PREFERRED EMBODIMENTS

In the present invention, the widths of the lines of a grating pattern do not have a 1:1 relation to the separations between the lines thereof, and the widths of the lines are selected to enable removal of given high order distortion components of the grating pattern of a scale. In other words, in the present invention, the widths of the lines of the grating pattern are determined so that the distortion components in the distribution of the grating pattern can be removed. Further, for example, for removal of the third and fifth order distortion components, two slits will do, thus enhancing the averaging effect.

Figure 3:
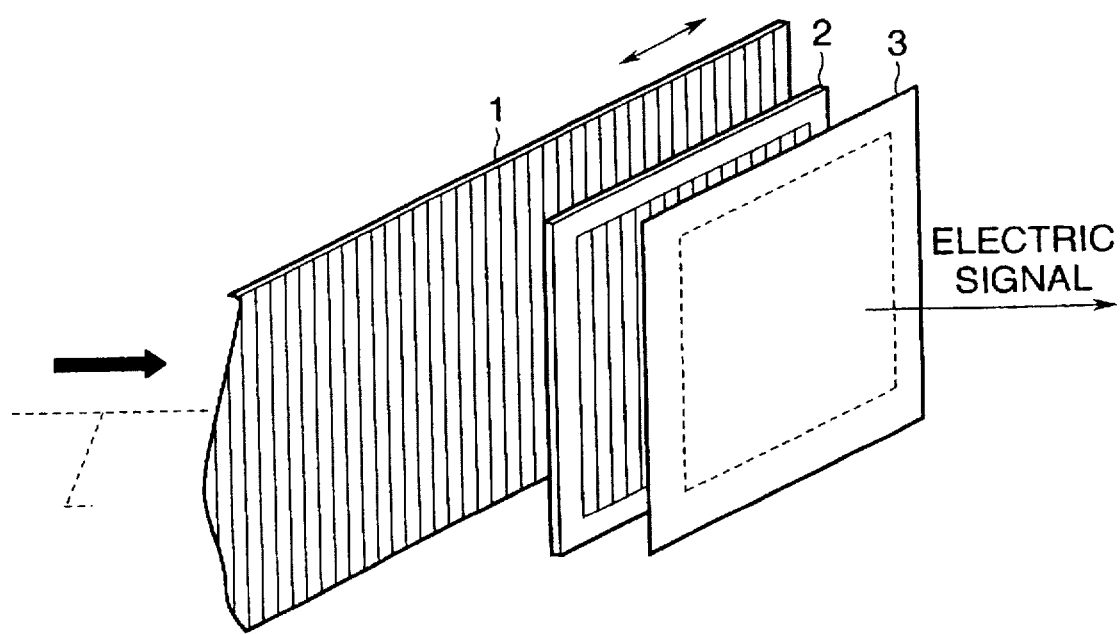
FIG. 3 is a perspective view showing a structure of an optical encoder according to a first embodiment of the present invention.
Figure 4:
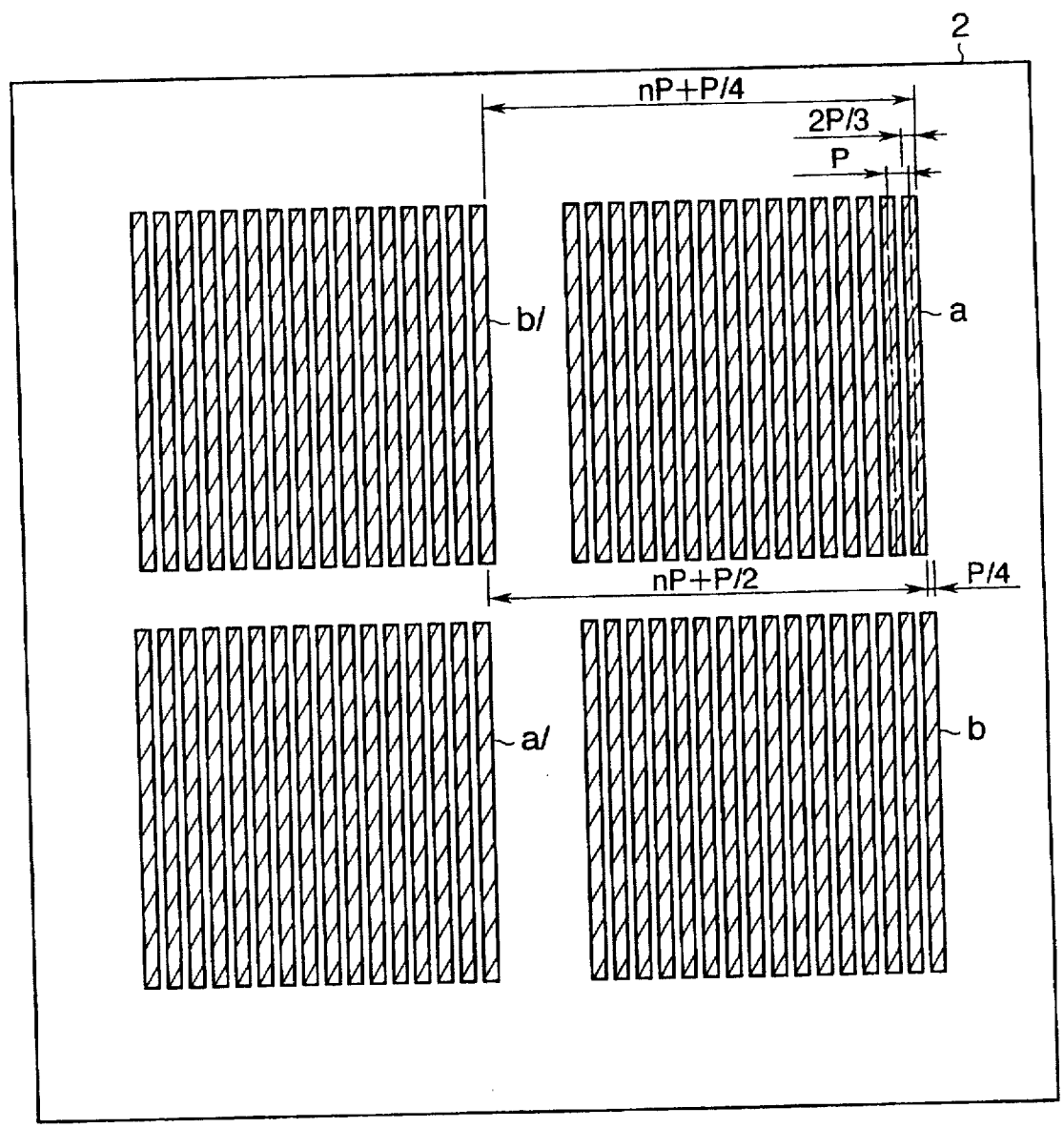
FIG. 4 illustrates one example of a grating section in the FIG. 3 embodiment.

FIG. 3 is a perspective view showing, of optical encoders according to the present invention, an optical encoder according to a first embodiment where an optical grating according to the present invention is used for a scale. In FIG. 3, the optical encoder comprises first and second diffraction gratings (which will hereinafter be referred to as "first grating" and "second grating", respectively) 1 and 2, the second grating 2 being disposed in the rear of the first grating 1 and being made to be movable relative to the first grating 1 in an arrow A direction. In addition, a light receiving section 3 is placed in the rear of the second grating 2. In this optical encoder, a grating section as shown in FIG. 4 is located on the second grating 2. The grating section as shown in FIG. 4 has lines arranged at intervals of several μm to several hundreds μm. This grating pattern is made to remove periodic components with a period 1/L times (in this case, L=3) that of the varying signal. In this embodiment, when its period is taken to be P, the width of the lines of the grating pattern is 2P/3. This grating pattern does not involve the third order distortion component, and the line width of the grating pattern is determined as follows.

When the grating pattern subjected to amplitude modulation with "0" and "1" is expressed as Fn(X) in the Fourier series expansion, the following equation (1) is obtainable.

$$Fn(X) = 2L/P + 2/\pi \times \Sigma 1/n \times \sin(2\pi nL/P) \times \cos(nX) \quad (1)$$

where 2L : the width of lines of the grating pattern

In this instance, in order to remove the third order distortion component (n=3) of this grating pattern, $\sin(2\pi nL/P) = \sin(2\pi 3L/P)$ is always zero. This is accomplished by satisfying $2\pi nL/P = n' \times \pi$. Accordingly, the following equation (2) is obtainable.

$$2L = P/n \times n' = P/3 \times n' \quad (2)$$

where n': 1, 2, 3, 4 . . . positive integer

In this case, "1" or "2" is selected as n', thus setting the line width of the grating pattern to P/3 or 2P/3. In this embodiment, 2P/3 is taken to provide a sufficient quantity of light. Further, when selecting as n' "3" or more, it is determined considering the interval of the lines of the grating pattern. Since the grating pattern does not involve or create distortion components, the intensity of that order diffracted light passing through this grating becomes zero. Accordingly, the signal obtainable in the light receiving section 3 of the optical encoder does not include the third order distortion component. In addition, in the case of removing the distortion components other than third order, the width of the lines of the grating pattern is, in a similar way, determined by applying that order number to n of the aforesaid equation (2).

In FIG. 4, the grating section is composed of four grating divisions a, b, a/, b/. These grating divisions a, b, a/, b/ are for the purpose of attaining four signals different in phase difference in the light receiving section 3 of the optical encoder, and with respect to the grating division a, the grating divisions b, a/ and b/ are disposed to have phase differences of P/4, P/2 and 3P/4, respectively. The optical encoder carries out the position calculation and others on the basis of the signals from these grating divisions a, b, a/ and b/. The grating section can be made up of 1, 2, 3 or more grating divisions.

Figure 5:
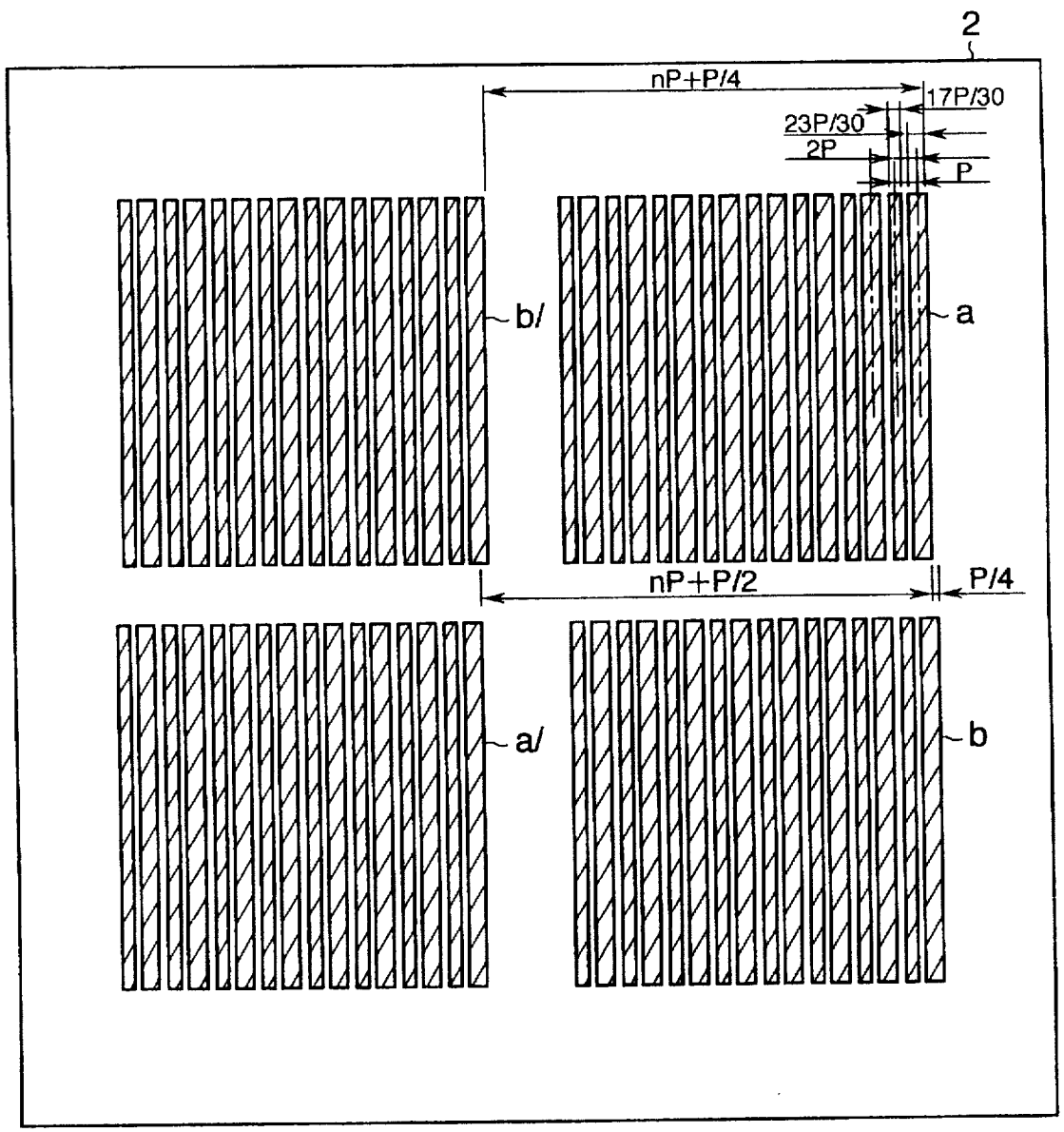
FIG. 5 shows another example of a grating section in the FIG. 3 embodiment.

Secondly, a further improved grating will be described hereinbelow with reference to FIG. 5. This embodiment employs a grating whose pattern line widths are 17P/30 and 23P/30. This grating pattern does not involve the third and fifth distortion components, and its pattern line widths are determined as follows. Assuming that the pattern line widths of two kinds of gratings are taken as 2L, the third and fifth order distortions of the grating patterns can be expressed as the following equation (3).

$$\text{third order distortion}=2/\pi\times\frac{1}{3}\times\sin(2\pi 3L/P)\times\cos(3X)$$

$$\text{fifth order distortion}=2/\pi\times\frac{1}{5}\times\sin(2\pi 5L/P)\times\cos(5X)=-2/\pi\times\frac{1}{5}\times\sin(2\pi 5L/P+\pi(1+2n''))\times\cos(5X) \quad (3)$$

Moreover, considering that the sum of the distortion component due to the grating with a grating pattern line width of 2L and the distortion component due to the grating with a pattern line width of 2L' becomes 0, the following equation (4) is obtainable.

$$\sin(2\pi 3L/P)+\sin(2\pi 3L'/P+2\pi n')=0$$

$$\sin(2\pi 5L/P)-\sin(2\pi 5L/P+\pi(1+2n''))=0 \quad (4)$$

where n' and n" denote integers

On the basis of the above equations the width of lines of the grating pattern is calculated. The calculation results are as follows.

$$2L=p(n/3+(1+2n'/10))$$

$$2L'=p(n/3-(1+2n'/10)) \quad (5)$$

In the generalization of the aforesaid equation (4), for removal of the a order and b order distortion components, the width of the lines of the grating pattern is determined as given by the following equation (6).

$$2L=p(n/a+(1+2n'/2b))$$

$$2L'=p(n/a-(1+2n'/2b)) \quad (6)$$

Figure 1:
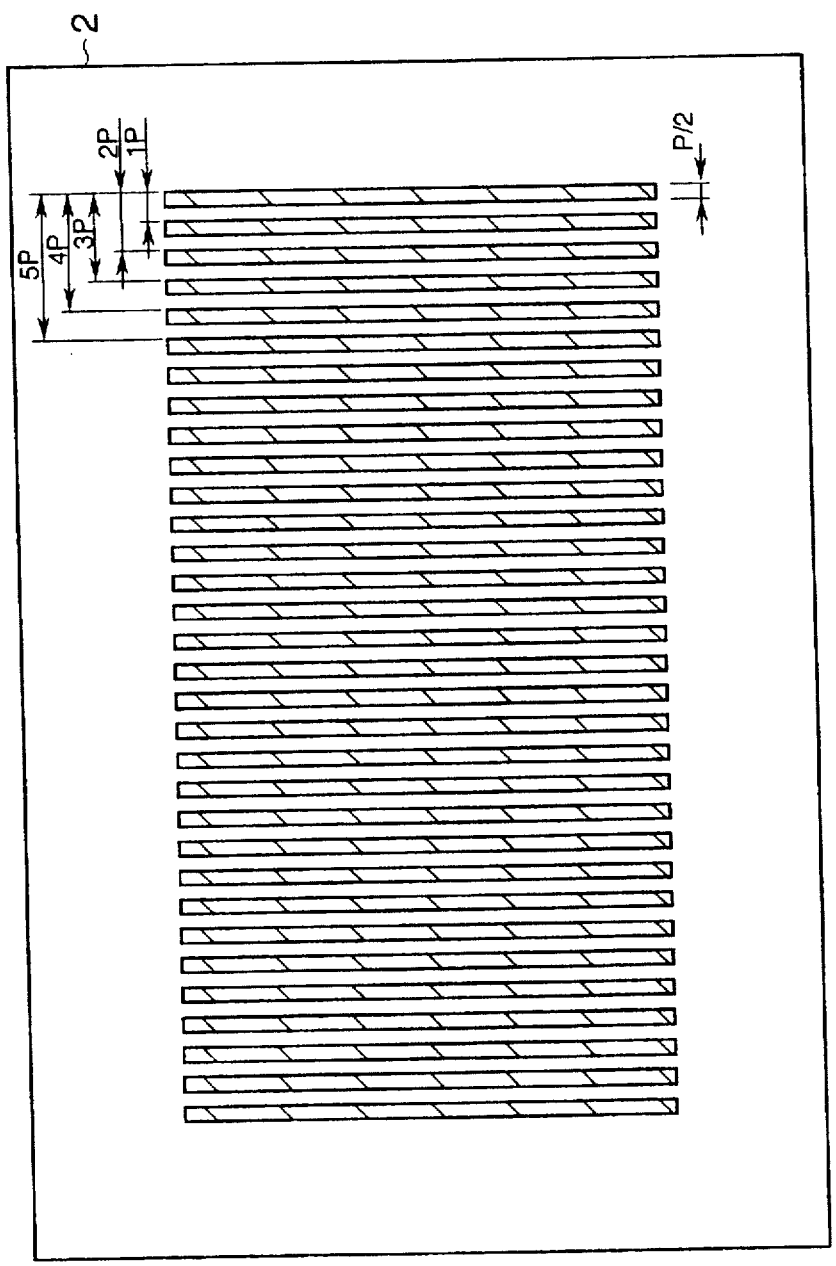
FIG. 1 is an illustration of an example of a grating section of a prior optical encoder.
Figure 2:
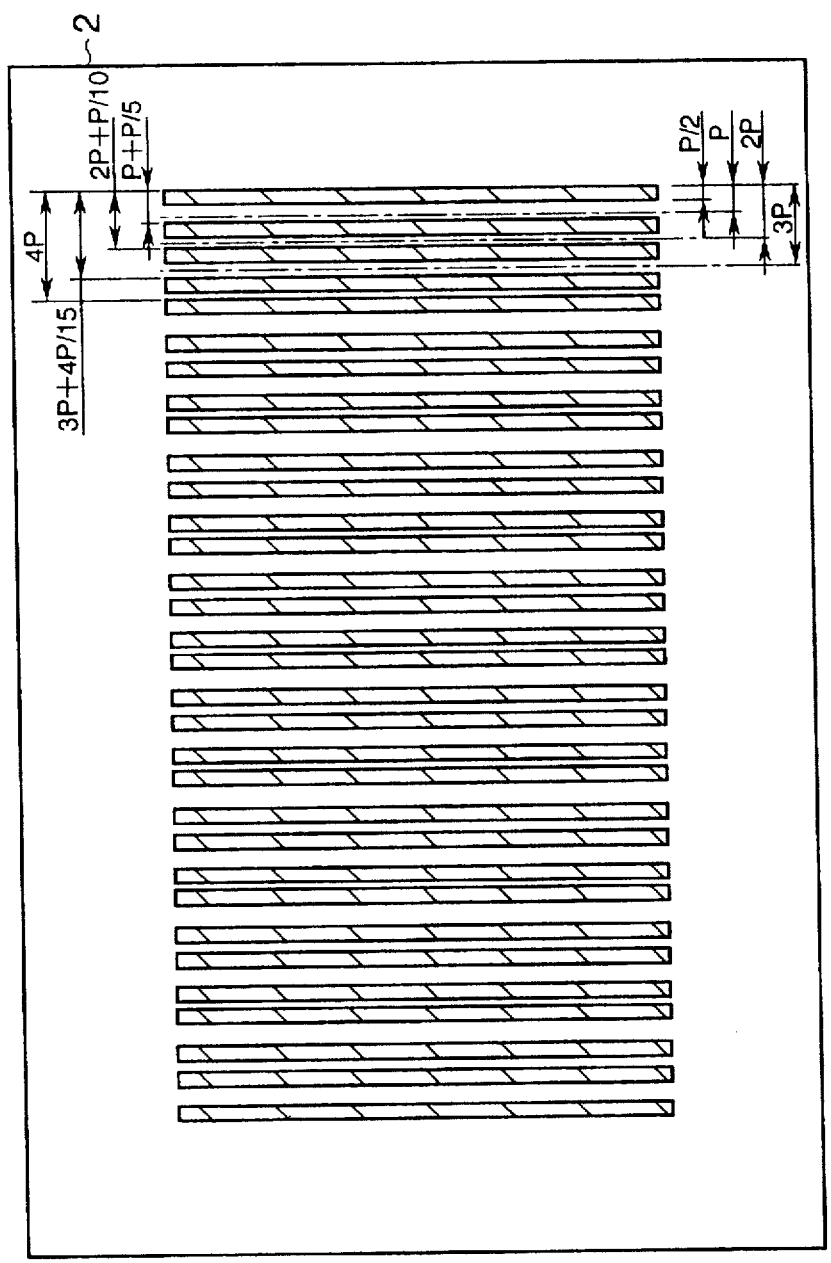
FIG. 2 is an illustration of an example of a grating section of a prior optical encoder.

From the above relation, with the employment of the gratings having two kinds of pattern line widths, two kinds of given distortions are removable. Although the values of the grating pattern line widths 2L and 2L' are free from restrictions by changing the values of n and n', the pattern line widths 2L and 2L' may be taken from a practical point of view as shown in FIG. 6. The values other than shown in FIG. 6 are selectable, while in the FIG. 6 instance the grating pattern line widths are limited to 2P. Incidentally, if taking a too large grating pattern line width, the density of the lines of the diffraction grating decreases to impair the averaging effect. If the grating pattern line widths below P are taken from these examples, then there are four kinds of combinations: 17P/30 and 23P/30, 11P/30 and 29P/30, 7P/30 and 13P/30, and P/30 and 19P/30. Accordingly, in addition to the example as shown in FIG. 5, these grating pattern line widths are also possible. Further, similarly, for removing the distortion components other than the third and fifth order distortion components, their pattern line widths are attainable by applying that order to n of the equation (5). That is why it is possible to simultaneously remove the distortion components of two kinds of orders, for example second and third orders, third and seventh orders and fifth and eleventh orders, by means of two gratings. In cases where the distortion components are removed due to the phase differences in the pattern as shown in FIG. 2, four gratings are necessary. Judging from this fact, the effect of the present invention is great.

Figure 7:
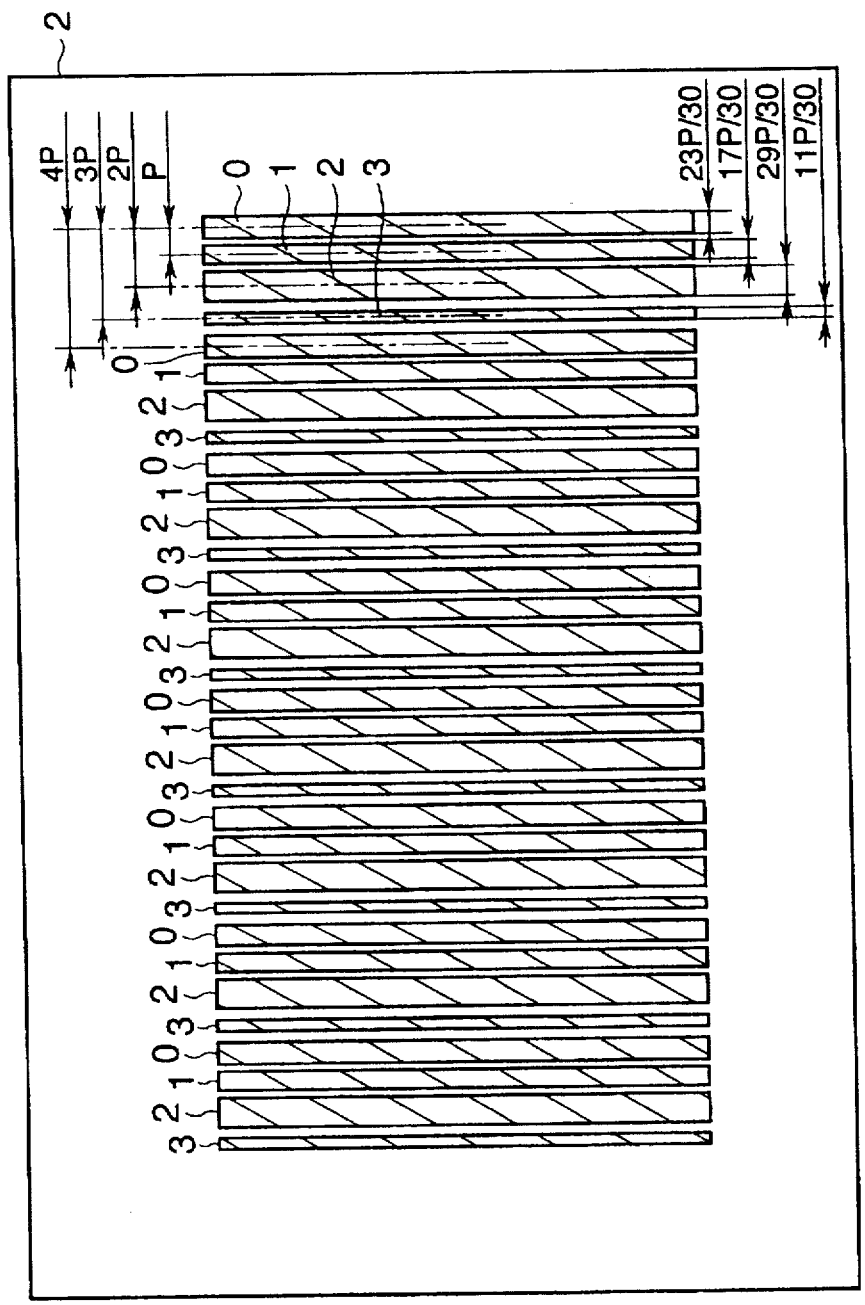
FIG. 7 shows a further example of a grating section in the FIG. 3 embodiment.

A description will be made hereinbelow of a third modification with reference to FIG. 7. In this modification, there are used a grating whose pattern line widths are 17P/30 and 23P/30 and a grating whose pattern line widths are 11P/30 and 29P/30. These two combinations of pattern line widths are selected from the aforesaid four combinations. In these grating patterns, the third and fifth distortion components are not included. The seventh distortion component is reducible as compared with the case of one combination as shown in FIG. 5. For this reason, the intensity of the seventh diffracted light of the light passing through the grating decreases, and hence, with the grating employed for an optical encoder, the seventh distortion component is reducible in the light-reception signal obtained in the light receiving section 3. Incidentally, if it is possible to obtain such an effect, a combination with a grating with a different pattern line width is possible, and a combination with a grating which can reduce another order (for example, eleventh order) distortion component is also appropriate.

Figure 8:
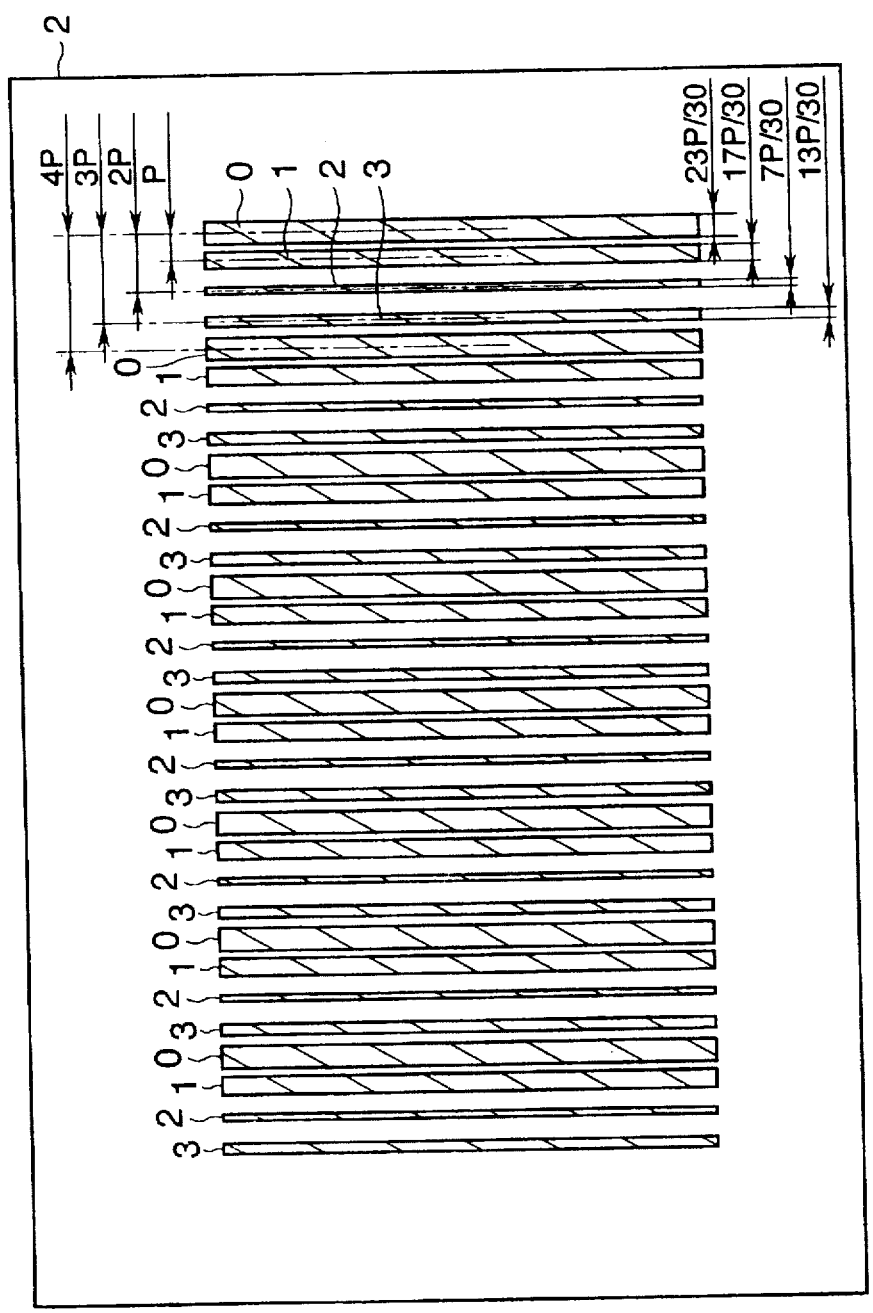
FIG. 8 illustrates a further example of a grating section in the FIG. 3 embodiment.

A fourth modification will be described hereinbelow with reference to FIG. 8. This modification employs a grating whose pattern line widths are 17P/30 and 23P/30 and a grating whose pattern line widths are 7P/30 and 13P/30. These pattern line widths are determined by selecting two combinations from the aforesaid four combinations. In these patterns, the ratio of the alternating portions is 1:1 as a whole, with the result that in addition to not including the third and fifth distortion components, they do not include the odd-number order components. Since a similar effect can be given if the ratio of the alternating portions as a whole is 1:1, different combinations are available. Moreover, this modification can be put in practical use in all the cases of simultaneously removing the other distortion components with two kinds of given orders, for example the second and third orders, the third and seventh orders.

Figure 9:
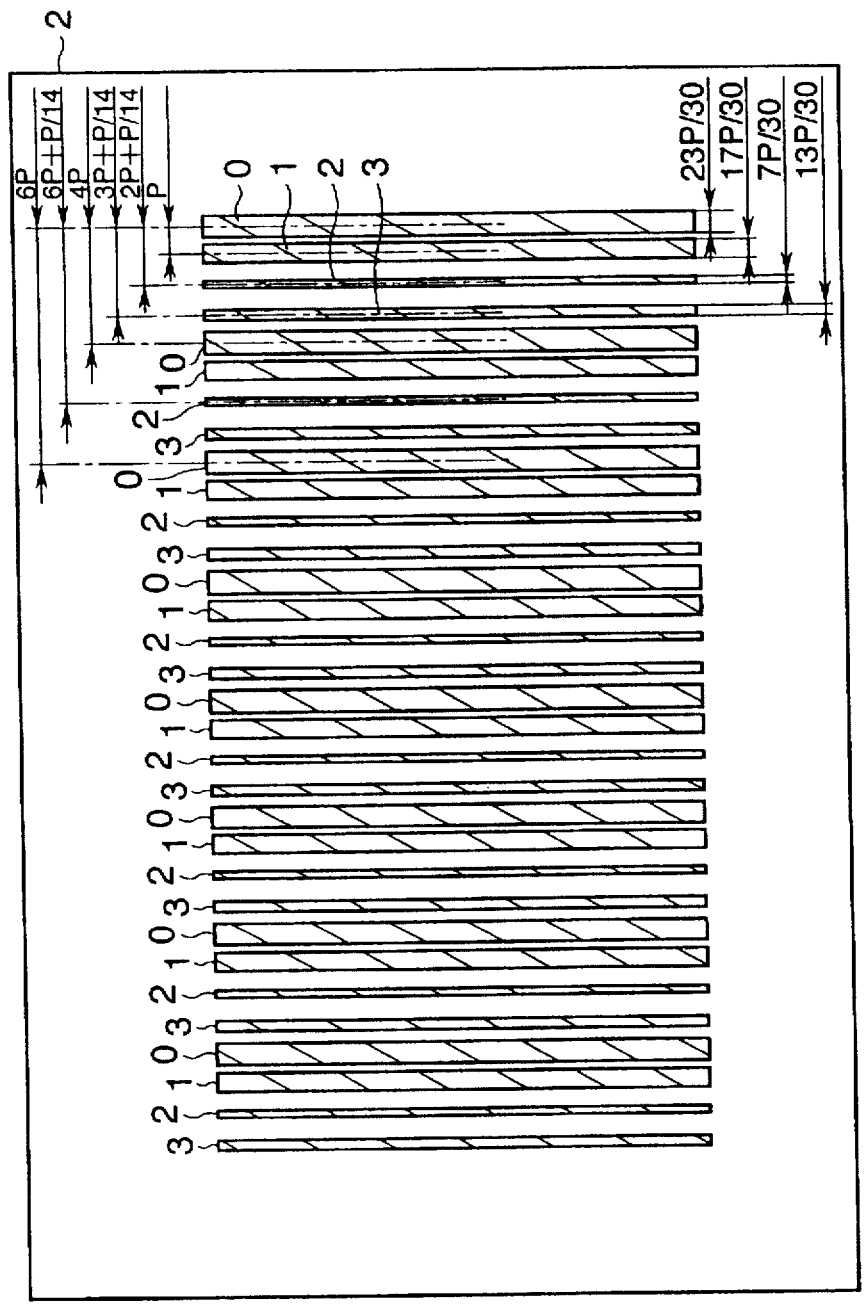
FIG. 9 illustrates a further example of a grating section in the FIG. 3 embodiment.

A further improved example of the FIG. 8 arrangement will be described hereinbelow with reference to FIG. 9. In FIG. 8 all the intervals between the pattern lines are P. On the other hand, in the FIG. 9 example, although there are similarly used a grating with pattern line widths of 17P/30 and 23P/30 and a grating with pattern line widths of 7P/30 and 13P/30, the line intervals are not constant. In the illustration, in relation to the lines 0, the lines 2 are placed to form an interval of 2P+P/14 while the lines 3 are located at an interval of 3P+P/14. That is, the groups of the lines 0 and 1 and the groups of the lines 2 and 3 are arranged to made a phase difference of P/14. This phase difference is determined so that the seventh order distortion components of the groups of the lines 0 and 1 and the seventh order distortion components of the groups of the lines 2 and 3 are in the antiphase relation to offset each other. Further, in cooperation with the effects due to the grating pattern line widths, it removes the third, fifth and seventh order distortion components. Incidentally, not only the seventh order distortion component but also given L order distortion components are removable. For this purpose, a phase difference is made by P/(2·L) between the line groups. In addition, limitation is not imposed on the right and left disposition order of the lines 0 to 3, while any disposition order is available if taking these combinations. For example, it is possible that the lines 0 and 1 are opposite to each other. Moreover, the widths of the pattern lines do not undergo any restriction if satisfying the equation (2) or (5), and two kinds of given order distortion components are removable concurrently.

Figure 10:
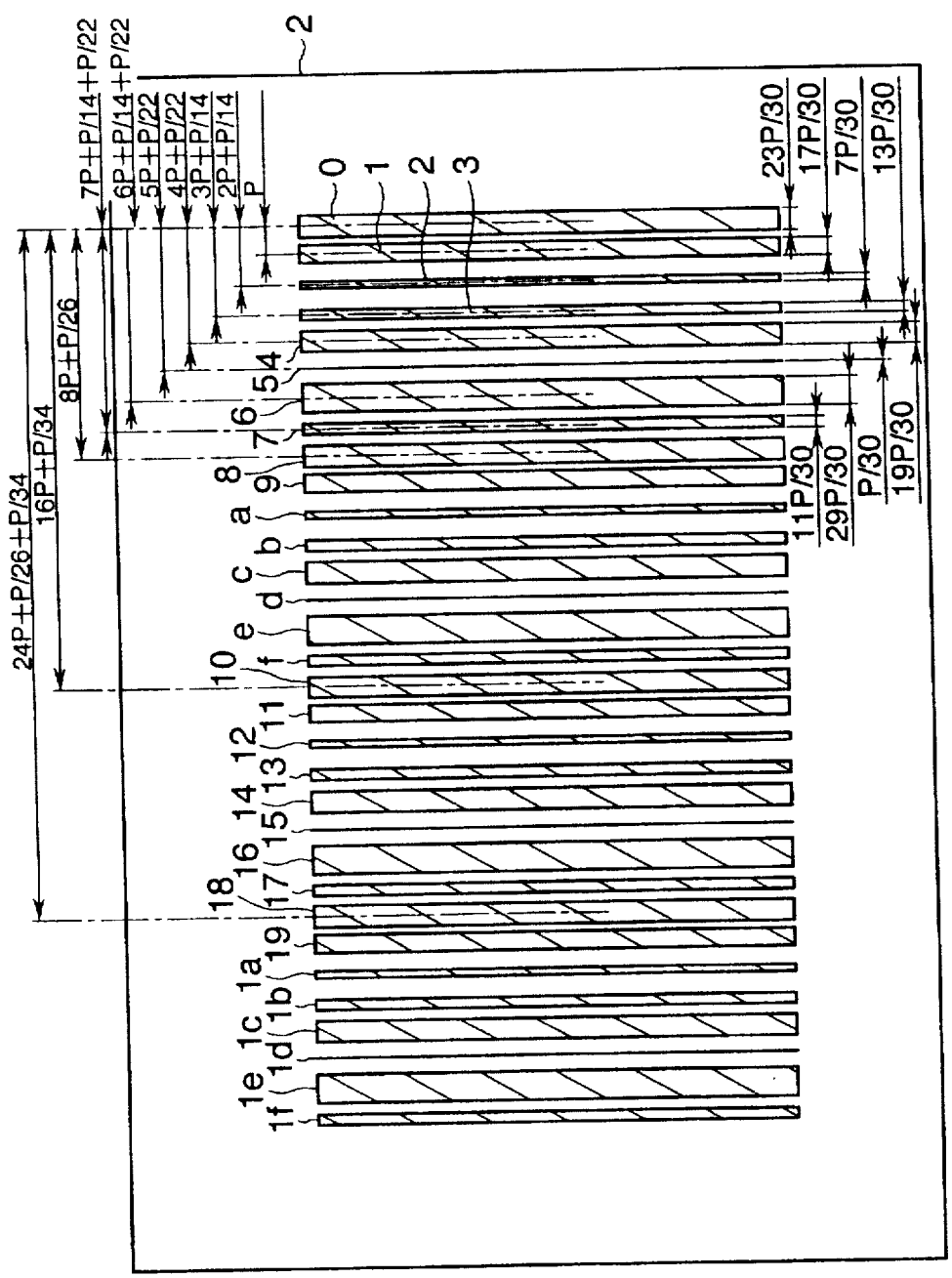
FIG. 10 shows a further example of a grating section in the FIG. 3 embodiment.

Furthermore, a description will be made hereinbelow of a a further modification of the present invention with reference to FIG. 10. In FIG. 10, the grating is constructed with 8 kinds of pattern line widths: 17P/30 and 23P/30, 7P/30 and 13P/30, P/30 and 19P/30, and 11P/30 and 29P/30. The phase differences in this pattern are more complicated than those of the FIG. 9 example. In this pattern, there exist no lines equal in width and phase difference from the line 0 to the line 1f. The phase differences are for the purpose of removing the seventh, eleventh, thirteenth and seventeenth order distortion components, and total 16 which are determined by combinations of four kinds of phase differences: P/(2·L), P/(2·m), P/(2·n) and P/(2·o) (where L=7, m=11, n=13, o=17). In FIG. 10, the group of the lines 0 and 1 and the group of the lines 2 and 3 are disposed to made a phase difference of P/14, and the seventh distortion components thereof are in antiphase relation to cancel each other. A group which is similar to the group of these four lines is present as a group of lines 4 to 7, and this group has a phase difference P/22 with respect to the group of the lines 0 to 3 so that the eleventh order distortion components are in antiphase relation to offset each other. In addition, a group of lines 8 to f makes a phase difference of P/26 relative to the group of the lines 0 to 7, and a group of lines 10 to 1f has a phase difference of P/34 with respect to the group of the lines 0 to f, with the result that the thirteenth and seventeenth order distortion components are respectively in antiphase relation to offset each other. Thus, when the line 0 is taken as a reference phase, the lines with the same pattern line width and the same phase difference do not exist. This grating has lines whose number is 32 and can eliminate the distortion components up to seventeenth order. In this example, there is no pattern to remove the ninth and fifteenth order distortion components. This is because the ninth order and the fifteenth order are a factor of the third order and is removable with the pattern for removing the third order distortion component.

With such a grating being used for an optical encoder, the light reception signal obtained by the light receiving section 3 does not suffer from the distortion components of odd orders up to the seventeenth order with respect to the basic period component. In the light reception signal, there are included the distortion components from the nineteenth order on and the distortion components of even orders, while for removal of the nineteenth order distortion component the pattern is made by using p=19 and by giving P/(2·19) in combinations. Further, the same way can be taken in the case of removing the twenty-third, twenty-ninth, . . . order distortion components. The distortion components from the nineteenth order are small to such a degree that it is proportional to 1 over the value obtained by raising the order number to the second power, and hence the division errors of the period coming from these distortion components are below 0.1%. Further, in the case that the light receiving section 3 is disposed immediately behind the second grating 2, the even-number order distortion components are extremely slight. Thus, if any, they can be removed by taking the difference from the antiphase signal so as to offset the ordinary offset voltage.

In this instance, the disposition order of the lines in the grating 2 is not limited to that as illustrated, and any disposition order is possible if taking such a combination. It is also appropriate to design the pattern so that the intervals of the pattern lines are as equal and close to each other as possible. In addition, in the present invention, the pattern portions and the non-pattern portions (the portions between the pattern lines) can also be disposed in the opposite way, and in this case, the same function is obtainable. Exactly one period is made by 16 lines, the entire disposition can assume one period or two periods. Moreover, although in the above-mentioned example the third and fifth order distortion components are designed to be removed by the determination of the pattern line widths, it is also possible to remove the different-order distortion components or to remove the different-order distortion components by means of the intervals of the pattern lines.

Figure 11:
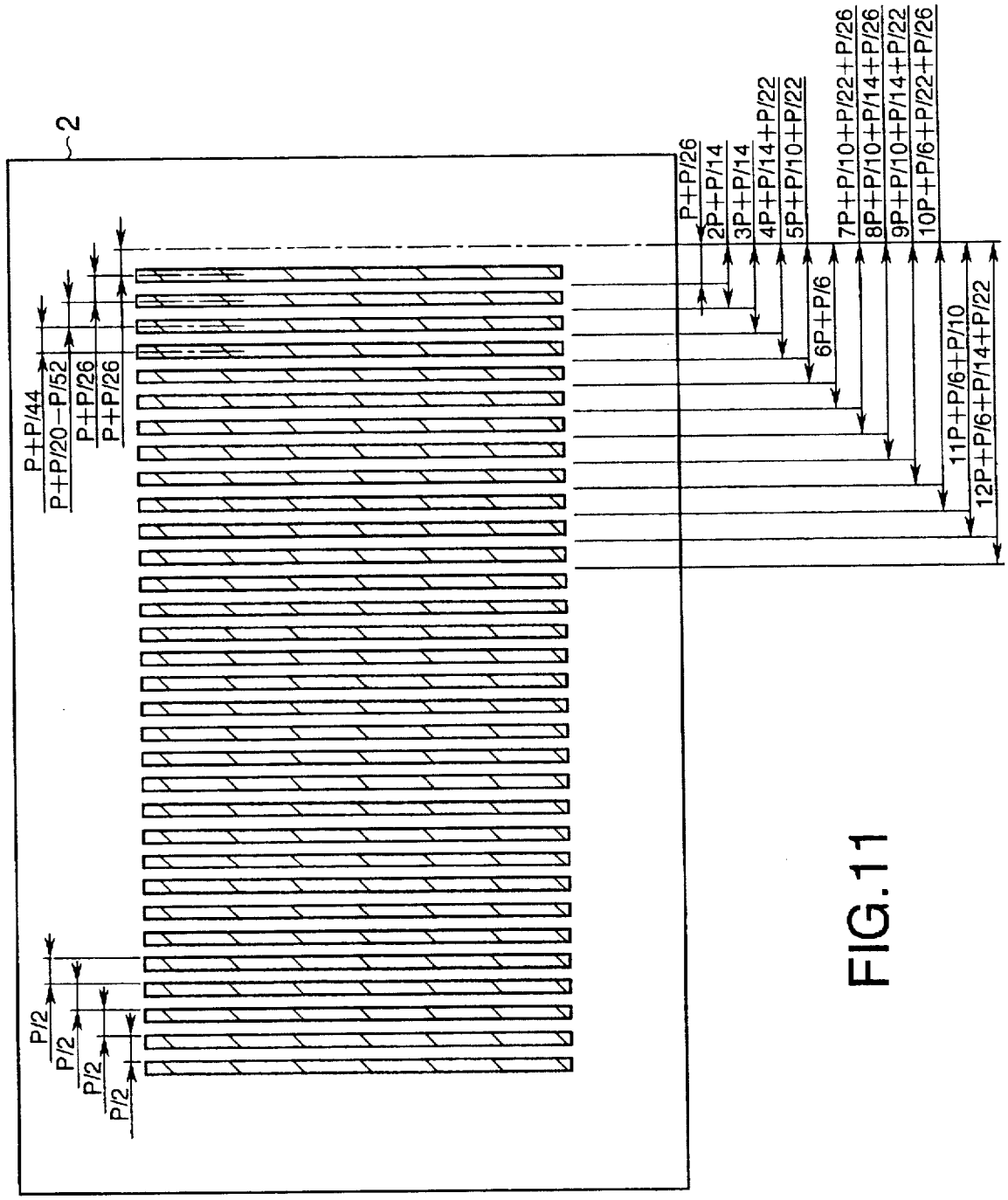
FIG. 11 shows a further example of a grating section in the FIG. 3 embodiment.

Still further, a description will be taken hereinbelow of a further modification of this invention with reference to FIG. 11. In this example, the separations between the pattern lines is set to P/2. In addition, owing to the phase differences of the non-pattern portions, it is made to remove the distortion components with the periods 1/L times, 1/m times, 1/n times, 1/o times and 1/p times (L=3, m=5, n=7, o=11 and p=13) of the varying signal. The phase differences of the non-patterned portions are determined by combinations of P/(2·L), P/(2·m), P/(2·n), P/(2·o), and P/(2·p), and in this case, they are 32 in number. The disposition order of the lines of the grating 2 is not limited to this example and any disposition is adoptable if including these combinations. In the FIG. 11 instance, the pattern is designed so that the separations between the patterned portions are as equal and close to each other as possible.

In this example, the light sensing signal obtained by the light receiving section 3 involves even-order distortion components. These even-order distortion components result from two diffractions at the first grating 1 and the second grating 2. Now that these even-order components are removable by taking the difference from the antiphase signal, it is desirable not to perform the aforesaid removal due to the pattern. This is because the removal of the second order distortion component due to the pattern can create a large loss. However, if there is no grain attenuation in the signal before the occurrence of the difference, it is preferable to clear the even-order distortion components.

Figure 12:
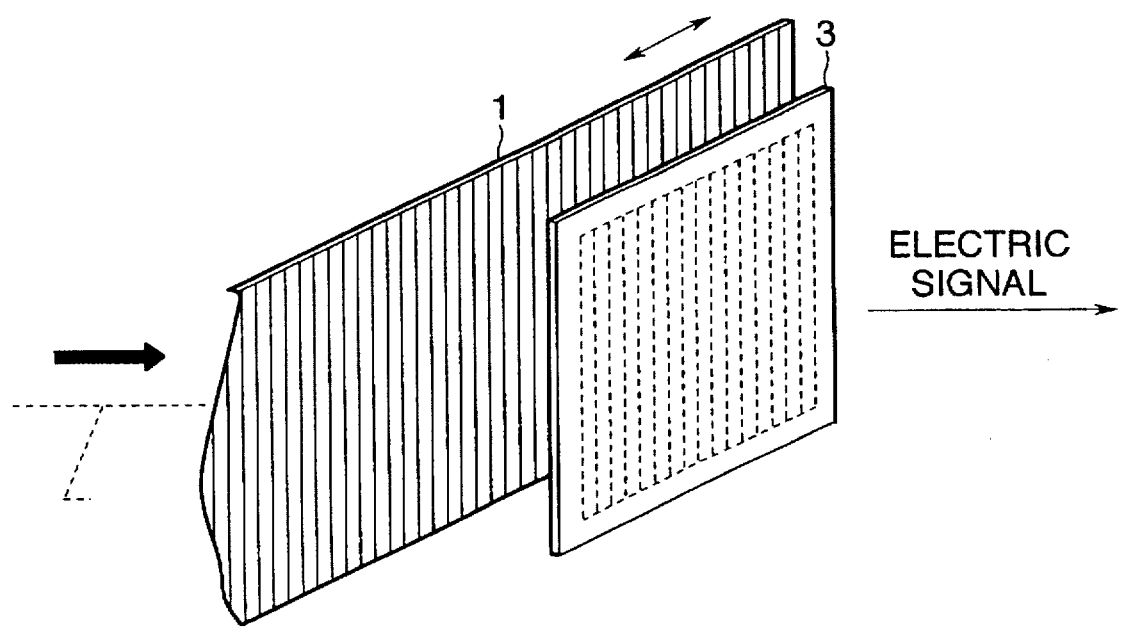
FIG. 12 is a perspective view showing a structure of an encoder according to a second embodiment of this invention.
Figure 13:
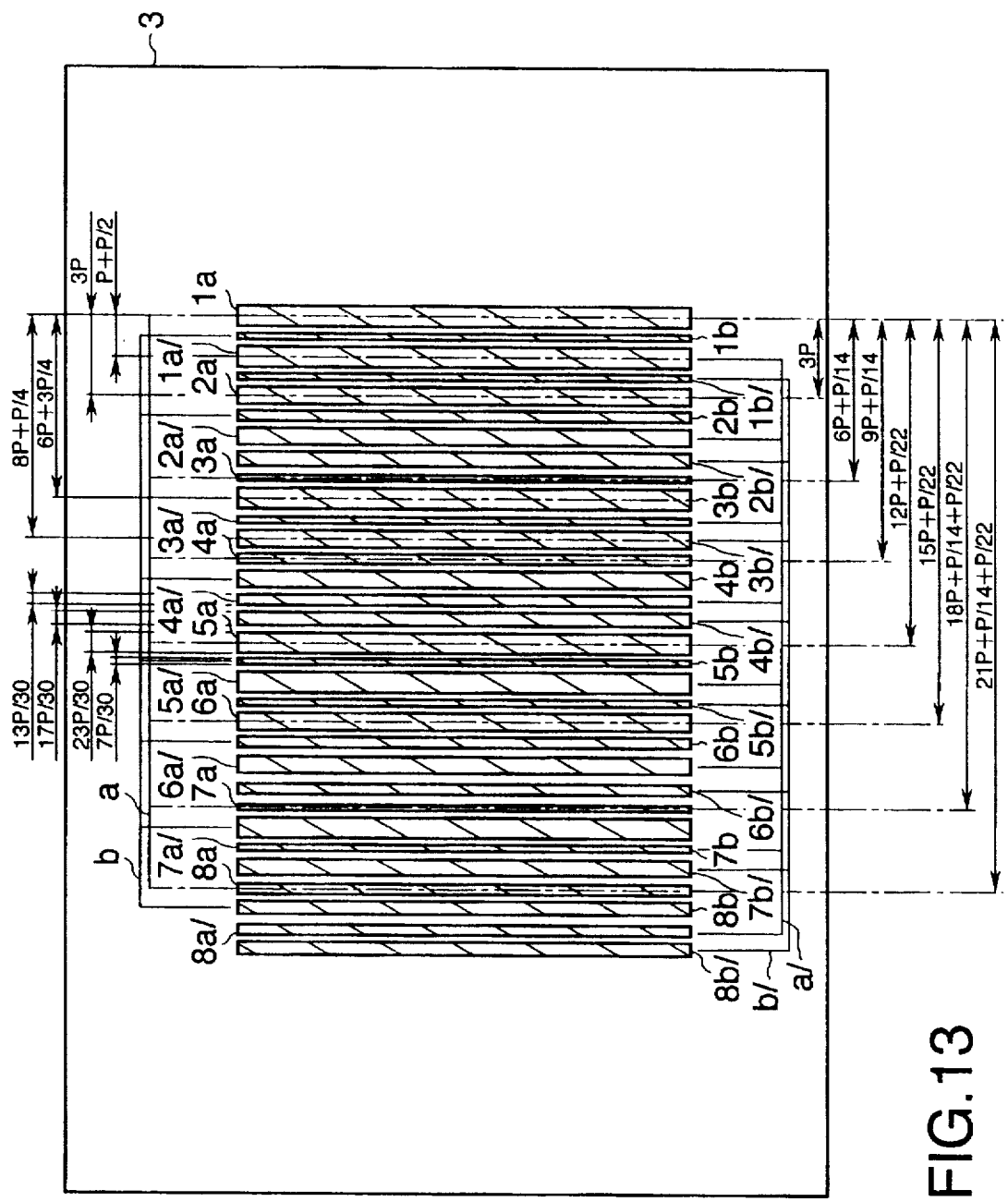
FIG. 13 is an illustration of one example of a light receiving section in the FIG. 12 embodiment.

A further improvement will be described hereinbelow with reference to FIG. 12. FIG. 12 is a perspective view showing an optical encoder according to another embodiment of the present invention in connection with the FIG. 3 structure. The parts corresponding to those in FIG. 3 are marked with the same numerals. In this optical encoder, as shown in FIG. 12, a light receiving section 3 is situated in the rear of a first grating 1, and light receiving elements of the light receiving section 3 are placed in a lattice configuration as shown in FIG. 13. In FIG. 13, the light receiving elements of the light receiving section 3 are disposed at intervals of several μm to several hundreds μm on average. The disposition pattern according to this embodiment is applied to an optical encoder which outputs four phase signals a, b, a/ and b/ (0°, 90°, 180°, 270°). As shown in the illustration, the light receiving elements for the respective phases, connected every four lines, are arranged by turns. In this embodiment, the number of the light receiving elements for a-phase is 8, i.e., 1a, 2a, 3a, 4a, 5a, 6a, 7a and 8a as illustrated. For example, the light receiving elements 1a and 2a are disposed to be spaced by 3P, while the light receiving elements 1b, 1a/ and 1b/ for the other phases are placed between the light-receiving elements 1a and 2a. The element widths and the inter-element separations of these 8 light receiving elements are made to remove the third, fifth, seventh and eleventh order distortion components of the signal to be obtained with this phase. The widths of the light receiving elements 1a and 2a are 23P/30 and 17P/30, respectively, and the widths of the light receiving elements 3a and 4a are 7P/30 and 13P/30, respectively, each not including the third and fifth components. Further, the light receiving elements 3a and 4a are disposed to have a phase difference of P/14 with respect to the light receiving elements 1a and 2a, and the seventh order distortion component of the light receiving elements 1a and 2a and the seventh order distortion component of the light receiving elements 3a and 4a are in antiphase relation to offset each other. Accordingly, the disposition pattern of these four light receiving elements does not suffer from the third, fifth and seventh order distortion components. In addition, since with respect to these four light receiving elements the light receiving elements 5a, 6a, 7a and 8a organizing a similar group are disposed to produce a phase difference P/22, the whole of 8 light receiving elements does not also create the eleventh order distortion component. In the case of clearing the distortion components up to the eleventh order by only the intervals or separations between the elements without changing the their widths, although 16 light receiving elements are necessary, according to the present invention the number of the light receiving elements can be reduced to half. This is a great effect. When the light receiving section 3 with such a light receiving element disposition is applied to an optical encoder, the signal to be obtained does not include the odd-number order distortion components up to the eleventh order and further does not include the even-number order distortion components. The reason for no inclusion of the even-number order distortion components which are included in the FIG. 3 embodiment is that a grating pattern is formed with the light receiving elements unlike the aforesaid second grating 2 and hence the second diffraction, which takes place on the second grating 2, does not occur in this case.

The remaining distortions are only extremely high order distortion components from the thirteenth order on. However, these are small to such a degree that it is proportional to 1 over the value obtained by raising the order number to the second power (in the case of the seventeenth order, 0.59% of the basic wave), and hence the division errors of the period coming from these distortion components can substantially be disregarded. Incidentally, for removing the distortion components from the thirteenth order on, the pattern is designed to add P/(2·13) into combinations. The seventeenth, nineteenth, . . . order distortion components are removable in the same way. The feature of the case that the grating pattern is formed with the light receiving elements is that, since there are no gain attenuation and no even-number order components, a desirable signal is attainable without taking the difference from the antiphase signal, thus providing a synergistic effect in cooperation with the removal of the distortion components by the grating pattern.

As well as the light receiving elements for the a-phase, the groups of the light receiving elements for the b-phase, a/-phase and b/-phase are further disposed to have the phase differences of P/4, P/2 and 3P/4 as shown in FIG. 13. The signals outputted from these light receiving element groups turn into four phase signals a, b, a/ and b/ which make a phase difference of 90° from each other. According to this embodiment, the light receiving elements for the respective phases are disposed in a mixed way, and hence unlike the other embodiments the dirt and cuts of the first grating 1, the nonuniformity of the irradiation beam and others substantially have equal influence on the light receiving elements for the respective phases, with the result that excellent detection is possible with less error.

Preferably, the pattern is designed so that the spaces between the elements are as equal as possible. In the example of this embodiment, the light receiving elements 2 whose widths are 7P/30 are located adjacent to the a-phase light receiving elements 1 with a width of 23P/30. The other elements are placed in a similar way. Thus, now that the spaces between the adjacent elements can substantially be maintained equally to be above a given value in any place, not only the production of the light receiving elements becomes easy, but also the optical characteristics, such as reducing the crosstalk between the light receiving elements, improve. These effects are great. Although in this embodiment exactly the 8 elements for one phase constitute one period, it is also possible that the entire element disposition is made to organize one period or two or more periods. In addition, the patterned portions and the non-patterned portions can be disposed in the opposite way. Incidentally, it is also possible that the pattern is designed to remove the distortion components of the orders other than the orders taken in this embodiment. Further, although the distortion components are removed by the element widths of the light receiving elements and the spaces between the elements, it can be cleared with only the element widths. In this case, it is possible to remove the distortion components other than the third and fifth orders.

The light receiving section 3 can be molded with a resin or can-packaged for environmental resistance, or it can be encased in a ceramic or metal made package with its light receiving surface being protected by a glass or a resin. In the present invention, the scale is applicable to not only optical encoders but also spectroscopes, wave meters, light-division or diffraction angle detector and others. In addition, the encoder according to the present invention can be of the optical, magnetic, electromagnetic or capacitance type. Further, the linear or rotary type is acceptable. Moreover, the present invention is applicable to the case that the pitch of the first grating is substantially equal to the average pitch of the second grating or the case that their pitches are different from each other, for example 1:2. That is, the present invention is not limited to the above-described embodiments and examples.

As described above, according to the present invention, it is possible to readily provide a smaller-distortion scale with a less number of pattern lines. In addition, according to the present invention, since a high-precision position detection is possible using a signal with no distortion components, for example a machine tool can perform processing with high precision to improve the production efficiency.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A scale having a grating pattern comprising a plurality of pattern lines therein, said pattern lines having widths determined so as to remove high-order distortion components with a distribution of said pattern lines, and said pattern lines including, for removing given A-order and B-order distortion components, pattern lines with widths W and W' that are given by $$\text{pattern line width } W = P \times (n/A + (1+2m)/2B)$$

$$\text{pattern line width } W' = P \times (n/A - (1+2m)/2B)$$

where n and m are integers, wherein A and B are different numbers of distortion components to be removed, and wherein P is the pattern line period.

2. The scale of claim 1, wherein, for removing given third order and fifth order distortion components, said pattern line widths W and W' are not identical, and said grating pattern includes at least two of said pattern lines having widths W and W' that are 17P/30 and 23P/30, at least two of said pattern lines having widths W and W' that are 11P/30 and 29P/30, at least two of said pattern lines having widths W and W' that are 7P/30 and 13P/30, at least two of said pattern lines having widths W and W' that are P/30 and 19P/30, and at least two of said pattern lines having widths W and W' that are 5P/30 and 35P/30.

3. An encoder comprising a first scale and a second scale that is movable relative to said first scale for detecting a displacement, wherein at least one of said first and second scales comprises a grating pattern comprising a plurality of pattern lines therein, said pattern lines having widths determined so as to remove high-order distortion components with a distribution of said pattern lines, and said pattern lines including, for removing given A-order and B-order distortion components, pattern lines with widths W and W' that are given by $$\text{pattern line width } W = P \times (n/A + (1+2m)/2B)$$

$$\text{pattern line width } W' = P \times (n/A - (1+2m)/2B)$$

where n and m are integers, wherein A and B are different numbers of distortion components to be removed, and wherein P is the pattern line period.

4. A scale having a grating pattern comprising a plurality of pattern lines therein, said pattern lines having widths and intervals that are determined so as to remove high-order distortion components, and said pattern lines including, for removing given A-order and B-order distortion components, pattern lines with widths W and W' that are determined by the following equations, wherein said pattern lines have spaces therebetween that are identical, and wherein, for removing given C-order and D-order distortion components, said grating pattern includes said pattern lines being shifted by P/(2·C), P/(2·D) and P/(2·C)+P/(2·D) with respect to a fundamental array pitch P where C and D denote different numbers of the distortion components to be removed and P designates an average period of said pattern lines, $$\text{pattern line width } W = P \times (n/A + (1+2m)/2B)$$

$$\text{pattern line width } W' = P \times (n/A - (1+2m)/2B)$$

where n and m are integers, and wherein A and B are different numbers of distortion components to be removed.

5. An encoder comprising a first scale and a second scale that is movable relative to said first scale for detecting a displacement, wherein at least one of said first and second scales comprises a grating pattern comprising a plurality of pattern lines therein, said pattern lines having widths and intervals that are determined so as to remove high-order distortion components, and said pattern lines including, for removing given A-order and B-order distortion components, pattern lines with widths W and W' that are determined by the following equations, wherein said pattern lines have spaces therebetween that are not identical, and wherein, for removing given C-order and D-order distortion components, said grating pattern includes said pattern lines being shifted by P/(2·c), P/(2·d) and P/(2·c)+P/(2·d), with respect to a fundamental array pitch P where C and D denote different numbers of the distortion components to be removed and P designates an average period of said pattern lines, $$\text{pattern line width } W = P \times (n/A + (1+2m)/2B)$$

$$\text{pattern line width } W' = P \times (n/A - (1+2m)/2B)$$

where n and m are integers and wherein A and B are different numbers of distortion components to be removed.

* * * * *